United States Patent [19]

Braeken et al.

[11] Patent Number: 4,761,439
[45] Date of Patent: Aug. 2, 1988

[54] ANTI-FOULING PAINT COMPOSITIONS

[75] Inventors: Jozef Braeken, Denderleeuw; Jean-Paul Dekerk, Heverlee, both of Belgium; Hendrik van der Poel, Amstelveen; Jozef Verborgt, ES Berkel-Rodenrijs, both of Netherlands

[73] Assignee: Labofina, S.A., Brussels, Belgium

[21] Appl. No.: 916,125

[22] Filed: Oct. 7, 1986

[30] Foreign Application Priority Data

Oct. 9, 1985 [LU] Luxembourg ............................ 86111

[51] Int. Cl.$^4$ ...................... C08L 31/02; C08L 33/02; C08K 3/20
[52] U.S. Cl. .................................. 523/122; 523/177; 524/315; 524/360; 524/376; 524/413; 524/432; 524/547
[58] Field of Search ................ 523/177, 122; 524/315, 524/360, 376, 413, 432, 547

[56] References Cited

U.S. PATENT DOCUMENTS

| | | | |
|---|---|---|---|
| 4,139,515 | 2/1979 | Dennington | 523/177 |
| 4,157,999 | 6/1979 | Matsuda et al. | 523/122 |
| 4,407,997 | 10/1983 | Sghibartz | 524/208 |
| 4,426,464 | 1/1984 | Sghibartz | 523/122 |
| 4,482,652 | 11/1984 | Datta | 523/122 |

*Primary Examiner*—Herbert J. Lilling
*Attorney, Agent, or Firm*—John K. Abokhair; Mark A. Montgomery; M. Norwood Cheairs

[57] ABSTRACT

A paint composition comprising a film-forming polymer, and at least one sparingly soluble metalliferous pigment, and wherein said polymer comprises (A) from 20 to 45 wt. % of monomer units of at least one triorganotin salt of an olefinically unsaturated carboxylic acid; (B) from 5 to 35 wt. % of at least one comonomer selected from the group consisting of VP (vinylpyrrolidone), VPi (vinylpiperidone) and VC (vinylcaprolactam), and wherein the total of A+B amounts to from about 40 to about 70 wt. % of the polymer composition; and (C) the balance of said polymer being monomer units of at least one $C_1$–$C_4$ alkyl methacrylate, styrene and mixtures of said methacrylate and styrene.

21 Claims, No Drawings

ANTI-FOULING PAINT COMPOSITIONS

FIELD OF THE INVENTION

This invention relates to marine anti-fouling (AF) paints generally used as top-coat paints on the hulls of ships. Particularly, the present invention relates to marine anti-fouling paints which erode at a predetermined rate, and more particularly to an improved polymeric binder for a marine anti-fouling paint which hydrolyzes at a predetermined rate in the presence of sea water.

BACKGROUND OF THE INVENTION

The performance of a ship falls off either when marine organisms grow on the sub-marine parts of her hull, or when the topcoat paint is applied irregularly or becomes rough during service.

The extent of marine fouling is controlled by applying to the hull a top coat paint comprising anti-fouling agents. The anti-fouling agents are biocides which are freed from the paint surface at a rate such that their concentration is lethal to marine organisms near the surface.

Anti-fouling paint compositions containing organometallic poisons which are chemically bound therein have been previously proposed.

British Pat. No. 1,124,297 discloses that a considerable increase in the anti-fouling efficacy of such paints is achieved by using pigments which have an appreciable water-solubility when incorporated in large quantity by comparison with the quantity of paint vehicle, and particularly if the pigments have a toxicity to marine organisms in their own right. However, the surface of the coating becomes progressively rougher due to the dissolution of part of the composition.

British Pat. No. 1,457,590, which is hereby incorporated by reference in its entirety, discloses a film-forming copolymer containing 50-80 wt.% triorganotin monomer, which gradually dissolves so that (i) a fresh anti-fouling paint surface is continuously revealed, and (ii) moving seawater smooths the surface of the coating. For environmental and other reasons, the triorganotin content is considered too high.

European patent application No. 51,930 (U.S. Pat. No. 4,407,997) discloses certain polymers of acrylate esters which can be used as the basis of erodible marine paints. The marine paints disclosed comprise a film-forming acrylic polymer and a sparingly soluble metalliferous pigment. The acrylic polymer comprises (A) 20-100 wt.% of monomer units selected from methyl acrylate and ethyl acrylate; (B) 0-45 wt.% of monomer units of a triorganotin salt of an olefinically unsaturated carboxylic acid; and (C) 0-80 wt.% of monomer units selected from $C_1$-$C_4$ alkyl methacrylate and styrene. Monomer units (A), (B) and (C) form at least 80 wt.% and the balance, if any, consists of monomer units of at least one other olefinically unsaturated comonomer. However, marine paints according to No. EP-51,930 have the disadvantage of showing considerable blistering and flaking. Due to the low hydrolysis rate of this copolymer, the self-polishing effect is not fully satisfactory.

Belgian Pat. No. 901,426 discloses marine paints comprising a film-forming polymer made from up to 60 wt.% of triorganotin acrylate or methacrylate; 1-80 wt.% of $C_1$-$C_2$ alkoxy $C_1$-$C_2$ alkyl(meth)acrylate; and 20-85 wt.% of $C_1$-$C_4$ alkyl methacrylate. However, the coatings obtained are relatively soft and therefore are more sensitive to mechanical damages. Moreover, some of the hereabove compositions contains TBTMA (triorganotin methacrylate) and high amounts of alkyl methacrylate do not show a sufficient hydrolysis rate, thus leading to the drawbacks well known in the art, particularly about the anti-fouling properties.

Many countries are introducing new stringent water quality programs, some of which call for a phased reduction in the triorganotin content of copolymer paints. The lowest efficient limit has been determined by T. A. Banfield (J. Oil Col. Chem. Assoc. 63, 93, 1980) to be 1 ug tributyltin oxide/$cm^2$.day. The lowest theoretical triorganotin monomer content in the binder may therefore be evaluated at about 10 wt.% for an erosion rate of 5 um/month.

There is therefore a need in the art for improved erodible anti-fouling paint compositions having a reduced content of organotin monomer while retaining the good anti-fouling and self-polishing properties of the anti-fouling paints of the prior art which contain 50-80 wt.% of organotin monomer.

SUMMARY OF THE INVENTION

An object of the present invention is to provide improved erodible anti-fouling paint compositions for use as top coat paints for the hulls of ships.

Another object of the invention is to provide an improved polymeric binder for a marine anti-fouling paint, which binder hydrolyzes at a predetermined rate in the presence of seawater.

A further object is to provide an improved polymeric binder for an erodible marine anti-fouling paint which has a reduced content of organotin monomer.

Accordingly, the present invention provides a marine paint comprising a film-forming polymer, and at least one sparingly soluble metalliferous pigment, characterized in that the polymer comprises (A) from 20 to 45 wt.% of monomer units of at least one triorganotin salt of an olefinically unsaturated carboxylic acid; (B) from 5 to 35 wt.% of at least one comonomer selected from the group consisting of VP (vinylpyrrolidone), VPi (vinylpiperidone) and VC (vinylcaprolactam), wherein the total of A+B mounting to from about 40 to about 70 wt.% of the polymer composition; and (C) the balance of the polymer being monomer units of at least one $C_1$-$C_4$ alkyl methacrylate and/or styrene.

DETAILED DESCRIPTION OF THE PREFERRED EMBODIMENTS

The Applicant has now unexpectedly found that by using a specific film-forming polymer composition in an erodible marine paint additionally comprising at least one sparingly soluble metalliferous pigment, a superior erodible anti-fouling paint is obtained. The polymer comprises from 20 to 45 wt.% of monomer units A of at least one triorganotin salt of an olefinically unsaturated carboxylic acid, and from 5 to 35 wt.% of at least one comonomer B selected from the group comprising VP (vinylpyrrolidone), VPi (vinylpiperidone) and VC (vinylcaprolactam), wherein the total of A+B amounts to from about 40 to about 70 wt.% of the polymer composition, and the balance of the polymer comprises monomer units C of at least one $C_1$-$C_4$ alkyl methacrylate and/or styrene.

The organotin monomer content was reduced while retaining the good properties of the anti-fouling paints of the prior art which contain 50–80 wt.% of organotin monomer.

This is really unexpected since the prior art does not teach or provide low organotin content paint compositions as hereabove described, which give coatings which do not show blistering or flaking while having good anti-fouling and self-polishing properties. Utilizing other monomers in low organotin paint compositions having the same solubility as the present invention would lead to flaking and blistering.

The monomer units A are preferably of the formula $R_3SnOOCCR'=CHR''$ where R is an alkyl radical containing 2 to 8 carbon atoms or an aryl or aralkyl radical, R' is H or $CH_3$ and R'' is H or $-COOSnR_3$. The groups R can be different but are preferably the same, for example $R_3Sn$ can be tributyl tin, tripropyl tin, tribenzyl tin, triphenyl tin, tritolyl tin or trihexyl tin. The carboxylate group $-OOCCR'=CHR''$ is preferably acrylate, methacrylate or maleate. The polymer comprises from 20 to 45 wt.% and preferably from 30 to 45 wt.% of monomer units A. Using lower than 20 wt.% of component A would result in a paint composition with reduced self-polishing properties. Greater than 45 wt.% is not disadvantageous, but the objective is to reduce the organotin content.

As monomer B, one may use VP and/or VPi and/or VC, but preferably VP. The polymer comprises from 5 to 35 wt.% of monomer B, preferably from 10 to 25 wt.%. Amounts greater than 35 wt.% would render the paint composition too hydrophilic. The resulting film would become swollen and dissolve too fast. The film would have poor mechanical properties. Using less than 5 wt.% of monomer B would not be sufficient to obtain the desired properties.

The sum of components A and B should be from about 40 to about 70 wt.% of the polymer composition, and preferably from about 50 to about 65 wt.%. Below 40 wt.%, the desired self-polishing effect is too low while about 70%, it becomes too high.

As monomer C, one may use one or several $C_1-C_4$ alkyl methacrylates and/or styrene. It is preferable to use one or several of said methacrylates, including ethylmethacrylate (EMA) and methylmethacrylate (MMA), the most preferred being MMA.

The monomer units C can be replaced, in an amount less than 10 wt.% with respect to the polymer, by one or several olefinically unsaturated comonomers other than those hereabove described as suitable for A, B or C. Higher amounts would give coatings which show flaking or blistering. Suitable replacement comonomers include EA (ethyl acrylate), MA (methyl acrylate), PA (propyl acrylate), BA (butyl acrylate), HA (hexyl acrylate), EHA (2-ethylhexyl acrylate), AN (acrylonitrile), MAN (methacrylonitrile), acrylamides such as DAAM (diacetone acrylamide) or NMA (N-methylolacrylamide), vinyl monomers such as VPy (vinyl pyridine), vinyl chloride, vinyl acetate, vinyl propionate or vinyl butyrate, methylvinylether, cyclohexene, vinylidene chloride, and other analogs.

The polymer can be prepared by addition polymerization of the appropriate monomers in the appropriate proportions at polymerization conditions using a free radical catalyst such as benzoyl peroxide, t-butyl peroxy 2-ethyl hexanoate (TBPEH), t-butyl peroxybenzoate (TBP), or azobisisobutyronitrile in an organic solvent such as xylene, toluene, butyl acetate, n-butanol, 2-ethoxyethanol, cyclohexanone, 2-methoxyethanol, 2-butoxyethanol and/or 2-ethoxyethyl acetate. When xylene is utilized as the organic solvent, polymerization is preferably carried out at a temperature in the range 70°–140° C., where the upper limit is the boiling point of the organic solvent. Within this range, the use of higher temperatures produces polymers of lower molecular weight. Polymerization may be carried out by heating all the polymer ingredients in the solvent or preferably by gradually adding the monomers and catalyst to the heated solvent. The latter procedure produces polymers of lower molecular weight. A chain transfer agent such as a mercaptan can also be used to produce polymers of lower molecular weight. For a given proportion of monomers the paint tends to dissolve in and become smoothed by relatively moving seawater more rapidly if the polymer has a lower molecular weight, and such polymers may be preferred when using a high proportion of monomer units C, particularly if monomer units C comprise styrene. With the same content of monomers A and B, lowering the molecular weight of the polymer increases the polishing rate. Mixtures of polymers of different compositions, or of higher and lower molecular weight polymers, can be used.

Alternatively the paint can be an aqueous emulsion paint based on a polymer prepared by emulsion polymerization.

The metalliferous pigment sparingly soluble in seawater (i.e., having a solubility of from 1 to 20 ppm by weight) is exemplified by cuprous thiocyanate, cuprous oxide, zinc oxide, cupric acetate meta-arsenate, zinc chromate, zinc dimethyl dithiocarbamate, zinc ethylene bis(dithiocarbamate), and zinc diethyl dithiocarbamate. The paint preferably includes at least one metalliferous pigment selected from zinc oxide, cuprous oxide and cuprous thiocyanate and pigments having similar seawater solubility. These pigments have a seawater solubility such that the pigment particles do not survive at the paint surface. The pigment has the effect of inducing the overall smoothing which the relatively-moving seawater exerts on the paint film, minimizing localized erosion and preferentially removing excrescences formed during the application of the paint. Mixtures of sparingly soluble pigments can be used. For example, zinc oxide which is most effective at inducing the gradual dissolution of the paint, can be mixed with cuprous oxide, cuprous thiocyanate, zinc dimethyl or diethyl dithiocarbamate, or zinc ethylene bis-(dithiocarbamate) which are more effective marine biocides.

Such mixtures preferably comprise up to 75 percent by volume zinc oxide and 25–100 percent by volume cuprous oxide or cuprous thiocyanate. This combination is preferable due to cost and synergistic biocidal effect. Zinc dimethyl dithiocarbamate, zinc ethylene bis(dithiocarbamate) and zinc diethyl dithiocarbamate are somewhat less soluble than cuprous oxide or thiocyanate. If used, they preferably form up to 75 percent by volume of the pigment, with at least 25 percent by volume of the pigment being zinc oxide.

The paint composition can additionally contain a pigment which is highly insoluble in seawater, such as titanium dioxide or ferric oxide. Such highly insoluble pigments can be used at up to 40 percent by weight of the total pigment component of the paint. The highly insoluble pigment has the effect of retarding the dissolution of the paint.

The proportion of pigment to polymer is generally such as to give a pigment volume concentration of at least 25 percent, preferably at least 35 percent, in the dry paint film. The upper limit of pigment concentration is the critical pigment volume concentration. Paints of pigment volume concentration about 50 percent, for example, have been found very effective for smoothing in seawater and preventing fouling.

The paint can contain other biocides effective as anti-fouling agents. Examples of such biocides, include di-thiocarbamate derivatives such as cuprous ethylene bis-di-thiocarbamate or 2-(N,N-dimethyl thiocarbamyl thio)-5-nitro thiazole, substituted isothiazolones particularly halogenated N-substituted isothiazolones, tetramethyl thiuran disulphide.

The invention is also illustrated by means of the following examples which are meant to be descriptive and by no means limiting.

EXAMPLE 1

A copolymer was produced by gradually adding 37.5 g TBTMA, 42.5 g MMA, 7.5 g EHA, 12.5 g VP, and 1.5 g TBPEH to 100 g xylene heated at 85° C. while stirring. After about 12 hours heating, no further polymerization was observed by monitoring residual monomers by gas chromatography. The solution was then heated to 110° C. for about one hour to destroy any residual activity of the catalyst. The product was an approximately 50 wt.% solution of copolymer in xylene.

40 g of the 50 wt.% solution of copolymer in xylene were blended with 2 g of anti-settling agents and stabilizers, 40 g of pigments and 20 g of additional xylene. The pigment component comprised 54 vol.% ZnO, 27 days conditioning, then 270 days thereafter, on 10 different places at 9 cm from the disc's center. The average erosion rate was 6.1 um/month.

The paint thus obtained was also tested for anti-fouling activity by applying it to a plaque over a vinyl resins/tar anti-corrosive paint, mounting the plaque on a panel and immersing the panel from a raft in a river estuary off Southern Netherlands for 12 months. Each panel also included plaques coated with a non-toxic control (which became heavily fouled with seaweed and some animal life within 4 weeks).

No weed or animal fouling was observed on the panels coated with the paint of the invention, and the algal slime was practically non-existent.

EXAMPLES 2 TO 17

The paints of these examples were produced and tested for erosion rate according to the procedure of Example 1. The compositions and the results of the erosion rate test are shown in the Table.

The paints of Examples 2 and 3 were further tested for their anti-fouling properties according to the procedure described in Example 1. No weed nor animal fouling were observed after twelve months exposure.

EXAMPLE 17

The erosion rate of a commercially successful paint was tested according to the procedure of Example 1, with the results as indicated in the Table.

TABLE

| Example n° | A Monomer name | wt. % | B Monomer name | wt. % | C Monomer name | wt. % | Substitution Monomer name | wt. % | Erosion Rate μm/month | Remarks |
|---|---|---|---|---|---|---|---|---|---|---|
| 1 | TBTMA | 37.5 | VP | 12.5 | MMA | 42.5 | EHA | 7.5 | 6.1 | |
| 2 | TBTMA | 35 | VP | 15 | MMA | 41 | EHA | 9 | 5.4 | |
| 3 | TBTMA | 30 | VP | 20 | MMA | 41 | EHA | 9 | 4.3 | |
| 4 | TBTMA | 45 | VP | 15 | MMA | 35 | EA | 5 | 9.8 | |
| 5 | TBTMA | 35 | VP | 20 | MMA | 45 | — | | 5.3 | |
| 6 | TBTMA | 45 | VP | 10 | MMA | 45 | — | | 5.1 | |
| 7 | TBTMA | 45 | VP | 15 | MMA EMA | 20 20 | — | | 6.0 | |
| 8 | TBTMA | 25 | VP | 30 | EMA | 45 | — | | 4.2 | |
| 9 | TBTA | 25 | VP | 15 | MMA | 60 | — | | 3.5 | |
| 10 | TBTA | 30 | VP | 15 | MMA | 55 | — | | 4.4 | |
| 11 | TBTMA | 40 | VPi | 15 | MMA | 45 | — | | 5.4 | |
| 12 | TBTMA | 45 | VP VC | 5 10 | MMA | 40 | — | | 5.9 | |
| 13 | TBTMA | 37.5 | VP | 12.5 | MMA | 35 | EA | 15 | 13 | Blistering and |
| 14 | TBTMA | 40 | VP | 20 | MMA | 20 | EA | 20 | 10 | Flaking |
| 15 | TBTMA | 45 | VP | 10 | MMA | 25 | EA | 20 | 10 | Heavy Blistering |
| 16 | TBTMA | 35 | ethoxymethyl methacrylate | 5 | EMA | 60 | — | | 1.2 | and Flaking Heavy Blistering |
| 17 | commercially successful paint | | | | | | | | 7.9 | and Flaking | vol. % zinc ethylene bis(dithiocarbamate), 9 vol. % Cu$_2$O, 6 vol. % TiO$_2$ and 4 vol. % of additives and stabilizers. The anti-settling agents, additives and stabilizers have no effect on the advantages of the present invention.

The anti-fouling paint thus obtained was tested for its erosion properties according to the following procedure. A steel disc of 20 cm diameter was first coated with a 220 um dry film thickness layer of a commercially available anti-corrosive paint based on coal tar and epoxy resin. The anti-fouling paint was applied as a layer having a dry film thickness of 120 um within 48 hours from the time the anti-corrosive paint layer became dry to the touch. After drying, the disc was rotated in a tank filled with continuously renewed natural seawater at a temperature of 25° C. The circumferential speed of the disc was about 27 knots (50 km/h). The first thickness measurements were made after seven

What we claim is:

1. A paint composition comprising a film-forming polymer, and at least one sparingly soluble metalliferous pigment, and wherein said polymer comprises (A) from 20 to 45 wt.% of monomer units of at least one triorganotin salt of an olefinically unsaturated carboxylic acid; (B) from 5 to 35 wt.% of at least one comonomer selected from the group consisting of VP (vinylpyrrolidone), VPi (vinylpiperidone) and VC (vinylcaprolactam), and wherein the total of A+B amounts to from about 40 to about 70 wt.% of the polymer; (C) up to 10 wt.% of an olefinically unsaturated comonomer selected from the group consisting of EA (ethyl acrylate), MA (methyl acrylate), PA (propyl acrylate), BA (butyl acrylate), HA (hexyl acrylate), EHA (2-ethylhexyl acrylate), AN (acrylonitrile), MAN (methacrylonitrile), acrylamides, vinyl pyridine, vinyl chloride, vinyl acetate, vinyl propionate, vinyl butyrate, methylvinylether, cyclohexene, vinylidene chloride, and mixtures and analogs thereof; and, (D) the balance of said polymer being monomer units selected from the group consisting of $C_1$-$C_4$ alkyl methacrylates, styrene, and mixtures thereof.

2. The paint composition of claim 1 wherein the (A) monomer units are of the formula $R_3SnOOCCR'=CHR''$ where R is an alkyl radical containing 2 to 8 carbon atoms or an aryl or aralkyl radical, R' is H or $CH_3$ and R'' is H or —$COOSnR_3$.

3. The paint composition of claim 2 wherein the groups R are different.

4. The paint composition of claim 3 wherein the groups R are the same.

5. The paint composition of claim 3 wherein the $R_3Sn$ group is selected from tributyl tin, tripropyl tin, tribenzyl tin, triphenyl tin, tritolyl tin or trihexyl tin.

6. The paint composition of claim 3 wherein the carboxylate group —$OOCCR'=CHR''$ is an acrylate, methacrylate or maleate.

7. The paint composition of claim 1 wherein the (D) component is a methacrylate.

8. The paint composition of claim 7 wherein the methacrylate is methyl methacrylate.

9. The paint composition of claim 1 wherein the polymer is prepared by addition polymerization of the components (A), (B), (C) and (D) at polymerization conditions using a free radical catalyst in an organic solvent.

10. The paint composition of claim 9 wherein the free radical catalyst is one selected from the group consisting of benzoyl peroxide, t-butyl peroxy 2-ethyl hexanoate (TBPEH), t-butyl peroxybenzoate (TBP), and azobisisobutyronitrile.

11. The paint composition of claim 9 wherein the organic solvent is one selected from the group consisting of xylene, toluene, butyl acetate, n-butanol, 2-ethoxyethanol, cyclohexanone, 2-methoxyethanol, 2-butoxyethanol and 2-ethoxyethyl acetate.

12. The paint composition of claim 1 wherein the metalliferous pigment is one selected from the group consisting of zinc oxide, cuprous oxide and cuprous thiocyanate.

13. The paint composition of claim 1 wherein the B monomer units are selected from the group consisting of VPi (vinylpiperidone) and VC (vinylcaprolactam).

14. The paint composition of claim 1 wherein said paint composition has an erosion rate of less than 10 um/month and does not blister or flake when tested according to the present examples.

15. A process for improving the performance of a ship comprising applying on the hull of a ship as a topcoat the paint composition of claim 1.

16. A paint composition consisting essentially of a film-forming polymer, and at least one sparingly soluble metalliferous pigment, wherein said polymer comprises (A) from 20 to 45 wt.% of monomer units of at least one triorganotin salt of an olefinically unsaturated carboxylic acid; (B) from 5 to 35 wt.% of at least one comonomer selected from the group consisting of VP (vinylpyrrolidone), VPi (vinylpiperidone) and VC (vinylcaprolactam), wherein the total of A+B amounts to about 40 to 70 wt.% of the polymer; and (C) the balance of said polymer being monomer units selected from the group consisting of $C_1$-$C_4$ alkyl methacrylates, styrene, mixtures of said methacrylates and styrene, and up to 10 wt.% of an olefinically unsaturated comonomer selected from the group consisting of EA (ethyl acrylate), MA (methyl acrylate), PA (propyl acrylate), BA (butyl acrylate), HA (hexyl acrylate), EHA (2-ethylhexyl acrylate), AN (acrylonitrile), MAN (methacrylonitrile), acrylamides, vinyl pyridine, vinyl chloride, vinyl acetate, vinyl propionate, vinyl butyrate, methylvinylether, cyclohexene, vinylidene chloride, and mixtures and analogs thereof.

17. The paint composition of claim 16 wherein the (A) monomer units are of the formula $R_3SnOOCCR'=CHR''$ and wherein the $R_3Sn$ end group is selected from the group consisting of tributyl tin, tripropyl tin, tribenzyl tin, triphenyl tin, tritolyl tin and trihexyl tin and the carboxylate end group —$OOCCR'=CHR''$ is selected from the group consisting of acrylates, methacrylates and maleates.

18. The paint composition of claim 16 wherein said polymer comprises from 30 to 45 wt.% monomer units of A, 10 to 25 wt.% monomer units of B and and the total of A+B amounts to about 50 to 65 wt.% of the polymer.

19. A process for preparing a paint composition comprising:
   (a) producing a film-forming polymer by gradually adding monomers and catalyst to a heated solvent wherein said monomers comprise (A) from 20 to 45 wt.% of at least one triorganotin salt of an olefinically unsaturated carboxylic acid; (B) from 5 to 35 wt.% of at least one comonomer selected from the group consisting of VP (vinylpyrrolidone), VPi (vinylpiperidone) and VC (vinylcaprolactam), and wherein the total of A+B amounts to about 40 to 70 wt.% of the total monomers; (C) up to 10 wt.% of an oleofinically unsaturated comonomer selected from the group consisting of EA (ethyl acrylate), MA (methyl acrylate), PA (propyl acrylate), BA (butyl acrylate), HA (hexyl acrylate), EHA (2-ethylhexyl acrylate), AN (acrylonitrile), MAN (methacrylonitrile), acrylamides, vinyl pyridine, vinyl chloride, vinyl acetate, vinyl propionate, vinyl butyrate, methylvinylether, cyclohexene, vinylidene chloride, and mixtures and analogs thereof; and (D) the balance of said monomers being selected from the group consisting of $C_1$-$C_4$ alkyl methacrylates, styrene and mixtures thereof; and
   (b) adding at least one sparingly soluble metalliferous pigment to said film-forming polymer.

20. The process according to claim 19 wherein said catalyst is a free radical catalyst selected from the group consisting of benzoyl peroxide, t-butyl peroxy 2-ethyl hexanoate (TBPEH), t-butyl peroxybenzoate (TBP), and azobisisobutyronitrile and said heated solvent is an organic solvent selected from the group consisting of xylene, toluene, butyl acetate, n-butanol, 2-ethoxyethanol, cyclohexanone, 2-methoxyethanol, 2-butoxyethanol and 2-ethoxyethyl acetate.

21. A paint composition comprising a film-forming polymer, and at least one sparingly soluble metalliferous pigment, and wherein said polymer comprises (A) from 20 to 45 wt.% of monomer units of at least one triorganotin salt of an olefinically unsaturated carboxylic acid; (B) from 5 to 35 wt. % of at least one comonomer selected from the group consisting of VP (vinylpyrrolidone), VPi (vinylpiperidone) and VC (vinylcaprolactam), and wherein the total of A+B amounts to from about 40 to about 70 wt. % of the polymer composition; and (C) the balance of said polymer being selected from the group consisting of $C_1$-$C_4$ alkyl methacrylates, styrene, and mixtures thereof wherein the paint composition has an erosion rate of less than 10 um/month and does not blister or flake, when applied and tested according to the present example 1.

* * * * *